(12) United States Patent
Iwata (10) Patent No.: US 9,749,555 B2
(45) Date of Patent: Aug. 29, 2017

(54) ARITHMETIC MEMORY WITH HORIZONTAL BINNING CAPABILITIES FOR IMAGING SYSTEMS

(71) Applicant: Semiconductor Components Industries, LLC, Phoenix, AZ (US)

(72) Inventor: Shusuke Iwata, Tokyo (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 174 days.

(21) Appl. No.: 14/172,741

(22) Filed: Feb. 4, 2014

(65) Prior Publication Data

US 2015/0222825 A1  Aug. 6, 2015

(51) Int. Cl.
*H04N 5/335* (2011.01)
*H04N 5/347* (2011.01)
*H04N 5/378* (2011.01)

(52) U.S. Cl.
CPC ............. *H04N 5/347* (2013.01); *H04N 5/378* (2013.01)

(58) Field of Classification Search
CPC ......... H04N 5/378; H04N 5/347; H04N 5/369
USPC ............. 348/302, 218.1, 294, 330, 301, 304
See application file for complete search history.

(56) References Cited

U.S. PATENT DOCUMENTS

| | | | |
|---|---|---|---|
| 6,166,367 A * | 12/2000 | Cho | H04N 5/335 250/208.1 |
| 7,479,994 B2 | 1/2009 | Yang et al. | |
| 7,515,183 B2 | 4/2009 | Yang et al. | |
| 7,515,783 B2 | 4/2009 | Kato et al. | |
| 7,991,245 B2 | 8/2011 | Putman et al. | |
| 8,330,635 B2 * | 12/2012 | Hisamatsu | H03K 23/62 341/118 |
| 8,626,273 B2 | 1/2014 | Yamaguchi et al. | |
| 2001/0015927 A1 * | 8/2001 | Ooishi | G11C 7/1051 365/201 |
| 2008/0084341 A1 * | 4/2008 | Boemler | H04N 5/3458 341/143 |
| 2008/0170137 A1 * | 7/2008 | Matsumoto | H04N 5/347 348/241 |
| 2008/0260291 A1 * | 10/2008 | Alakarhu | G06T 3/4015 382/298 |
| 2009/0237534 A1 * | 9/2009 | Okumura | H03M 1/1019 348/294 |

(Continued)

*Primary Examiner* — Tuan Ho
*Assistant Examiner* — Zhenzhen Wu
(74) *Attorney, Agent, or Firm* — Treyz Law Group, P.C.; Jason Tsai; Joseph F. Guihan (57) ABSTRACT

An image sensor may include an array of image pixels arranged in rows and columns. Each group of adjacent pixel columns may be coupled to a respective arithmetic memory circuit via corresponding analog-to-digital converter circuitry. The arithmetic memory circuit may include at least first, second, third, and fourth arithmetic units coupled in a chain. In some arrangements, only a subset of columns in each group of adjacent pixel columns is actively coupled to the arithmetic memory circuit. In other arrangements, all of columns in each group of adjacent pixel columns are actively coupled to the arithmetic memory circuit. The columns may be directly coupled to different arithmetic units in the arithmetic memory circuit to implement weighted horizontal binning or to the same arithmetic unit in the arithmetic memory circuit to implement flat horizontal binning.

7 Claims, 10 Drawing Sheets

(56) References Cited

U.S. PATENT DOCUMENTS

| | | | | |
|---|---|---|---|---|
| 2009/0256936 A1* | 10/2009 | Sonoda | ............... | H04N 5/3456 348/294 |
| 2011/0074968 A1* | 3/2011 | Kim | ...................... | H04N 5/378 348/222.1 |
| 2012/0140089 A1* | 6/2012 | Koh | ................... | H04N 5/23245 348/220.1 |
| 2013/0063295 A1* | 3/2013 | Hagihara | ............... | H04N 5/378 341/169 |
| 2013/0089175 A1* | 4/2013 | Mo | ....................... | H04N 5/355 377/49 |
| 2014/0340551 A1* | 11/2014 | Hwang | ................. | H04N 5/345 348/302 |

\* cited by examiner

| HORIZONTAL BINNING SCHEMES |||
|---|---|---|
| OUT_LEFT | OUT_CENTER | OUT_RIGHT |
| 0 : | 1 : | 0 |
| 0 : | 2 : | 0 |
| 1 : | 1 : | 1 |
| 2 : | 2 : | 2 |
| 1 : | 2 : | 1 |
| 2 : | 4 : | 2 |

ARITHMETIC MEMORY WITH HORIZONTAL BINNING CAPABILITIES FOR IMAGING SYSTEMS

BACKGROUND

This relates generally to imaging systems and, more particularly, to imaging systems that use arithmetic memory to implement horizontal binning.

Image sensors are commonly used in electronic devices such as cellular telephones, cameras, and computers to capture images. In a typical arrangement, an electronic device is provided with an array of image pixels arranged in pixel rows and pixel columns. Circuitry is commonly coupled to each pixel column for reading out image signals from the image pixels.

In a conventional arrangement, each pixel column is connected to a corresponding arithmetic memory block. The arithmetic memory block in each column is used to receive signals from the image pixels in that pixel column and can be used to implement correlated double sampling (CDS) and also vertical binning by combining the values of image pixels in different rows. The arithmetic memory blocks in this conventional arrangement can only conduct vertical binning but cannot conduct horizontal binning (i.e., the arithmetic memory blocks cannot be used to combine the image pixel values from different columns).

It would therefore be desirable to provide improved imaging systems having arithmetic memory with horizontal binning capabilities.

DETAILED DESCRIPTION

Imaging systems having digital camera modules are widely used in electronic devices such as digital cameras, computers, cellular telephones, and other electronic devices. A digital camera module may include one or more image sensors that gather incoming light to capture an image.

In some situations, imaging systems may form a portion of a larger system such as a surveillance system or a safety system for a vehicle (e.g., an automobile, a bus, or any other vehicle). In a vehicle safety system, images captured by the imaging system may be used by the vehicle safety system to determine environmental conditions surrounding the vehicle. As examples, vehicle safety systems may include systems such as a parking assistance system, an automatic or semi-automatic cruise control system, an auto-braking system, a collision avoidance system, a lane keeping system (sometimes referred to as a lane drift avoidance system), etc.

In at least some instances, an imaging system may form part of a semi-autonomous or autonomous self-driving vehicle. Such imaging systems may capture images and detect nearby vehicles using those images. If a nearby vehicle is detected in an image, the vehicle safety system may sometimes operate a warning light, a warning alarm, or may activate braking, active steering, or other active collision avoidance measures. A vehicle safety system may use continuously captured images from an imaging system having a digital camera module to help avoid collisions with objects (e.g., other automobiles or other environmental objects), to help avoid unintended drifting (e.g., crossing lane markers) or to otherwise assist in the safe operation of a vehicle during any normal operation mode of the vehicle.

Image sensors may include arrays of image pixels. The pixels in the image sensors may include photosensitive elements such as photodiodes that convert the incoming light into electric charge. Image sensors may have any number of pixels (e.g., hundreds or thousands or more). A typical image sensor may, for example, have hundreds, thousands, or millions of pixels (e.g., megapixels).

Figure 1:
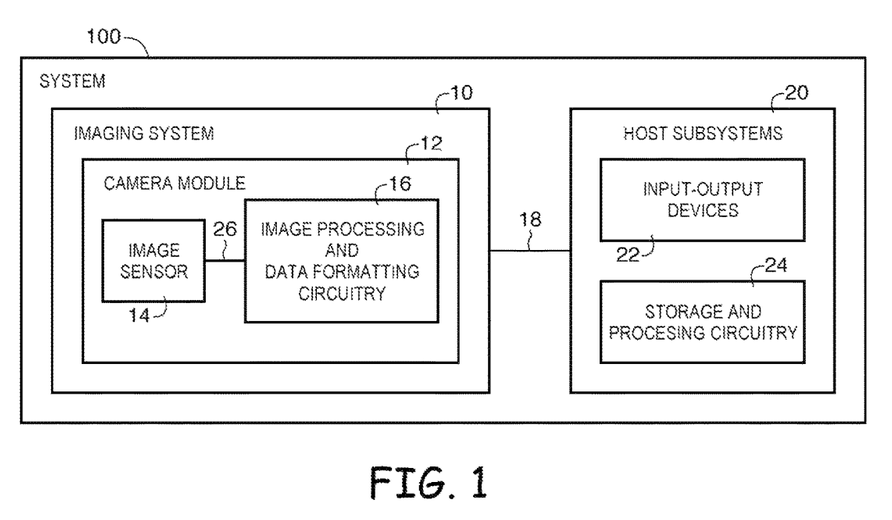
FIG. 1 is a diagram of an illustrative system that includes an imaging system and a host subsystem in accordance with an embodiment of the present invention.

FIG. 1 is a diagram of an illustrative imaging and response system including an imaging system that uses an image sensor to capture images. System 100 of FIG. 1 may be an electronic device such as a camera, a cellular telephone, a video camera, a vehicle safety system (e.g., an active braking system or other vehicle safety system), a surveillance system, or other electronic device that captures digital image data As shown in FIG. 1, system 100 may include an imaging system such as imaging system 10 and host subsystems such as host subsystem 20. Imaging system 10 may include camera module 12. Camera module 12 may include one or more image sensors 14 and one or more lenses. The lenses in camera module 12 may, as an example, include M*N individual lenses arranged in an M×N array. Individual image sensors 14 may be arranged in a corresponding M×N image sensor array (as an example). The values of M and N may each be equal to or greater than one, may each be equal to or greater than two, may exceed 10, or may have any other suitable values.

Each image sensor in camera module 12 may be identical or there may be different types of image sensors in a given image sensor array integrated circuit. During image capture operations, each lens may focus light onto an associated image sensor 14. Image sensor 14 may include photosensitive elements (i.e., pixels) that convert the light into digital data. Image sensors may have any number of pixels (e.g., hundreds, thousands, millions, or more). A typical image sensor may, for example, have millions of pixels (e.g., megapixels). As examples, image sensor 14 may include bias circuitry (e.g., source follower load circuits), sample and hold circuitry, correlated double sampling (CDS) circuitry, amplifier circuitry, analog-to-digital (ADC) converter circuitry, data output circuitry, memory (e.g., buffer circuitry), address circuitry, etc.

Still and video image data from image sensor 14 may be provided to image processing and data formatting circuitry 16 via path 26. Image processing and data formatting circuitry 16 may be used to perform image processing functions such as data formatting, adjusting white balance and exposure, implementing video image stabilization, face detection, etc. Image processing and data formatting circuitry 16 may also be used to compress raw camera image files if desired (e.g., to Joint Photographic Experts Group or JPEG format). In a typical arrangement, which is sometimes referred to as a system on chip (SOC) arrangement, camera sensor 14 and image processing and data formatting circuitry 16 are implemented on a common semiconductor substrate (e.g., a common silicon image sensor integrated circuit die). If desired, camera sensor 14 and image processing circuitry 16 may be formed on separate semiconductor substrates. For example, camera sensor 14 and image processing circuitry 16 may be formed on separate substrates that have been stacked.

Imaging system 10 (e.g., image processing and data formatting circuitry 16) may convey acquired image data to host subsystem 20 over path 18. Host subsystem 20 may include an active control system that delivers control signals for controlling vehicle functions such as braking or steering to external devices. Host subsystem 20 may include processing software for detecting objects in images, detecting motion of objects between image frames, determining distances to objects in images, filtering or otherwise processing images provided by imaging system 10. Host subsystem 20 may include a warning system configured to disable imaging system 10 and/or generate a warning (e.g., a warning light on an automobile dashboard, an audible warning, or other warning) in the event that verification data associated with an image sensor indicates that the image sensor is not functioning properly.

If desired, system 100 may provide a user with numerous high-level functions. In a computer or advanced cellular telephone, for example, a user may be provided with the ability to run user applications. To implement these functions, host subsystem 20 of system 100 may have input-output devices 22 such as keypads, input-output ports, joysticks, and displays and storage and processing circuitry 24. Storage and processing circuitry 24 may include volatile and nonvolatile memory (e.g., random-access memory, flash memory, hard drives, solid state drives, etc.). Storage and processing circuitry 24 may also include microprocessors, microcontrollers, digital signal processors, application specific integrated circuits, etc.

Figure 2:
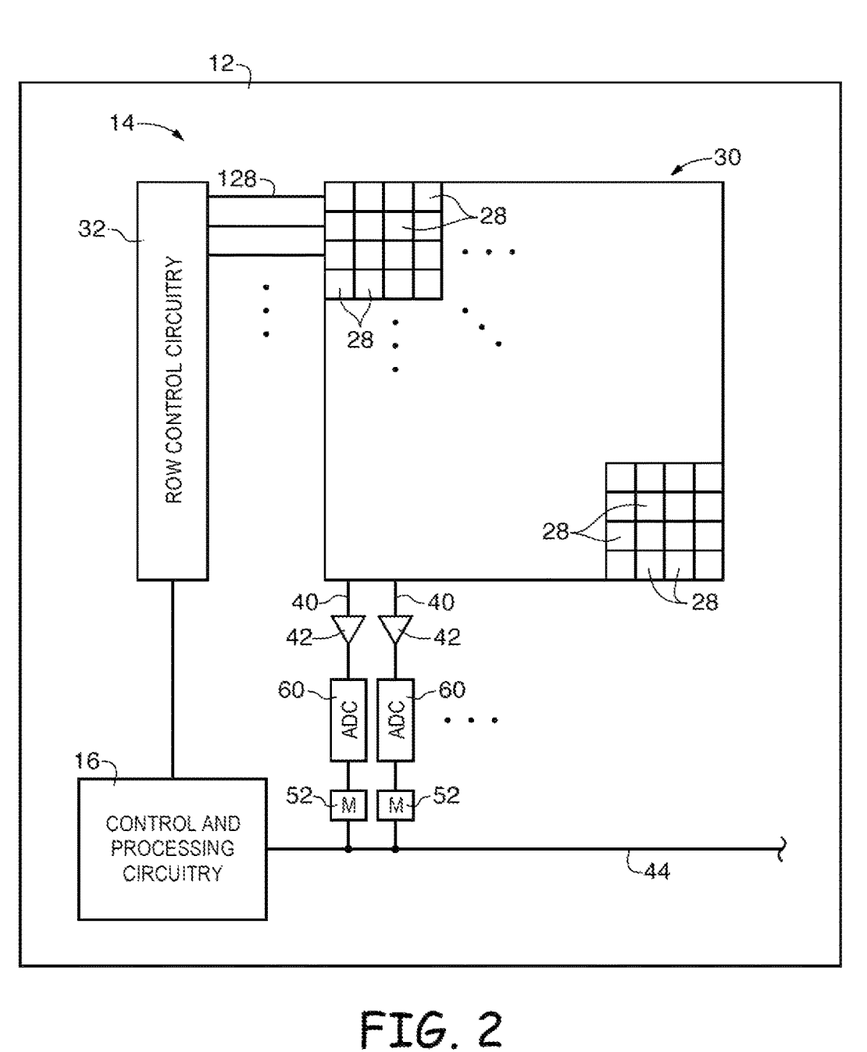
FIG. 2 is a diagram of an illustrative image sensor having an array of image pixels and control circuitry coupled to the array of image pixels in accordance with an embodiment of the present invention.

An example of an arrangement for camera module 12 is shown in FIG. 2. As shown in FIG. 2, camera module 12 includes image sensor 14 and control and processing circuitry 16. Image sensor 14 may include a pixel array such as array 30 of pixels 28. Control circuitry 16 may be coupled to row control circuitry 32 and global data path 44. Row control circuitry 32 may receive row addresses from control circuitry 16 and may supply corresponding row control signals to image pixels 28 over control paths 128. One or more conductive lines such as column lines 40 may be coupled to each column of image pixels 28 in image pixel array 30. Column lines 40 may be used for reading out image signals from image pixels 28 and for supplying bias signals (e.g., bias currents or bias voltages) to image pixels 28. During image pixel readout operations, a pixel row in image pixel array 30 may be selected using row control circuitry 32 and image data associated with image pixels 28 of that pixel row may be read out on column lines 40.

Row control circuitry 32 may generate signals on paths 128 as desired. For example, row control circuitry 32 may generate reset signals on reset control lines in paths 128, transfer signals on transfer control lines in paths 128, and row select (e.g., row readout) signals on row select control lines in paths 128 to control the operation of array 30. If desired, row control circuitry 32 and array 30 may be integrated together in a single integrated circuit (as an example).

Each column line 40 may be coupled to column circuitry such as a column amplifier 42, an analog-to-digital converter (ADC) circuit 60, and a column memory circuit 52. ADC circuits 60 may be used to convert analog signals on column lines 40 into corresponding digital signals before outputting to memory circuits 52.

Array 30 may have any number of rows and columns. In general, the size of array 30 and the number of rows and columns in array 30 will depend on the particular implementation of image sensor 14. While rows and columns are generally described herein as being horizontal and vertical, respectively, rows and columns may refer to any grid-like structure (e.g., features described herein as rows may be arranged vertically and features described herein as columns may be arranged horizontally).

Figure 3:
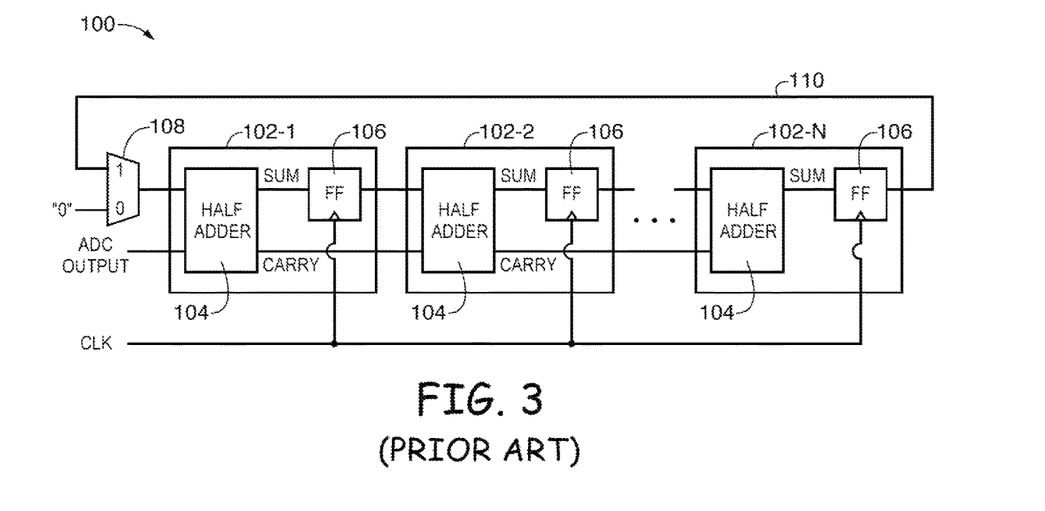
FIG. 3 is a circuit diagram of a conventional arithmetic memory block.

FIG. 3 is a diagram of a conventional column memory circuit 100 sometimes referred to as an arithmetic memory circuit. Arithmetic memory circuit 100 includes N arithmetic units 102 connected in a chain (i.e., arithmetic units 102-1, 102-2, . . . , 102-$n$ connected in series). Each arithmetic unit 102 includes a half adder 104 and a flip-flop circuit 106. Half adder 104 in each unit 102 has first and second inputs, a sum output, and a carry output. The sum output of half adder 104 is coupled to the data input of the associated flip-flop 106 in the same unit 102. Flip-flop 106 has a data output that is connected to the first input of the half adder in a successive unit 102. The carry output of half adder 104 is connected to the second input of the half adder in a successive unit.

The second input of half adder 104 in the first arithmetic unit 102-1 may receive a bit from a corresponding column ADC circuit. The first input of half adder 104 in the first arithmetic unit 102-1 may be coupled to a multiplexer 108. Multiplexer 108 has a first (0) input that receives a logic "0" value and a second (1) input that is coupled to the data output of flip-flop 106 in the last arithmetic unit 102-$n$ via feedback path 110. Flip-flop 106 in each unit 102 is controlled by a clock signal CLK. Connected in this way, the ADC output may be serially fed into arithmetic memory circuit 100.

When implementing correlated double sampling (CDS), the logic "0" may be fed through multiplexer 108 during loading of the sampled reset signal, whereas the stored reset signal is fed through multiplexer 108 via path 110 during loading of the sampled image signal. Units 102 may be configured to subtract the image signal from the reset signal while loading of the sampled image signal to obtain the desired CDS result. If desired, vertically binning can be implemented using a similar approach by feeding a CDS result from a previous row back to the first unit 102-1 during loading of reset/image signals in a newly selected row.

Arithmetic memory circuitry 100, however, cannot be implemented to perform horizontal binning. It would therefore be desirable to provide improved column memory circuitry capable of performing horizontal binning in additional to vertical binning.

Figure 4:
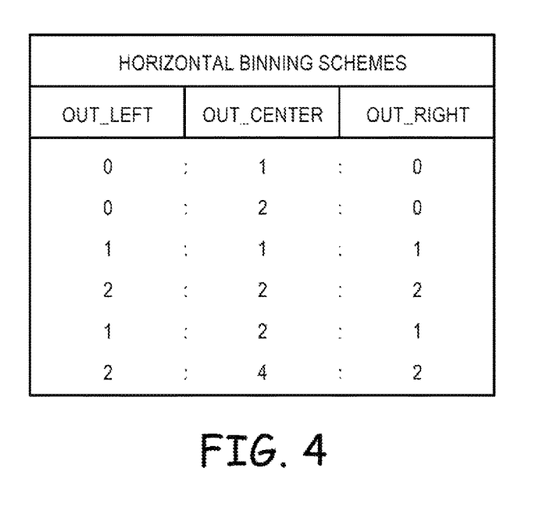
FIG. 4 is a table of illustrative horizontal binning schemes that can be implemented using improved arithmetic memory circuitry in accordance with an embodiment of the present invention.

In accordance with an embodiment, column arithmetic memory circuitry is provided that is capable of implementing various horizontal binning schemes as shown in the table of FIG. 4. FIG. 4 shows an X-Bin3 operation where data signals read out from every three adjacent columns are "binned" together to produce a combined output. The data signals read out from each group of three pixel columns may be referred to herein as OUT_LEFT, OUT_CENTER, and OUT_RIGHT. Signals OUT_LEFT, OUT_CENTER, and OUT_RIGHT may represent signals generated at the output of respective column ADCs 60 (FIG. 1).

In one suitable embodiment, a 0:1:0 horizontal binning scheme can be implemented by only outputting the pixel signal from the center column while ignoring the pixel signals from the left and right columns. In another suitable embodiment, a 0:2:0 horizontal binning scheme can be implemented by outputting twice the pixel signal from the center column while ignoring the pixel signals from the left and right columns.

In another suitable embodiment, a 1:1:1 horizontal binning scheme can be implemented by simply combining the pixel values from the left, center, and right columns (e.g., the combined output is equal to the sum of OUT_LEFT, OUT_CENTER, and OUT_RIGHT). In another suitable embodiment, a 2:2:2 horizontal binning scheme can be implemented by combining double the pixel values from the left, center, and right columns (e.g., the combined output is equal to the sum of 2*OUT_LEFT, 2*OUT_CENTER, and 2*OUT_RIGHT).

In yet another suitable embodiment, a 1:2:1 horizontal binning scheme can be implemented by combining the pixel values from the left and right columns with double the pixel value from the center column (e.g., the combined output is equal to the sum of OUT_LEFT, 2*OUT_CENTER, and OUT_RIGHT). In yet another suitable embodiment, a 2:4:2 horizontal binning scheme can be implemented by combining double the pixel values from the left and right columns with four times the pixel value from the center column (e.g., the combined output is equal to the sum of 2*OUT_LEFT, 4*OUT_CENTER, and 2*OUT_RIGHT). The horizontal binning scheme in which weighting factor is the same for all the combined columns may be referred to as "flat" binning, whereas the horizontal binning scheme in which the center column is weighted more than the left and right columns may be referred to as "center-weighted" binning.

Figure 5:
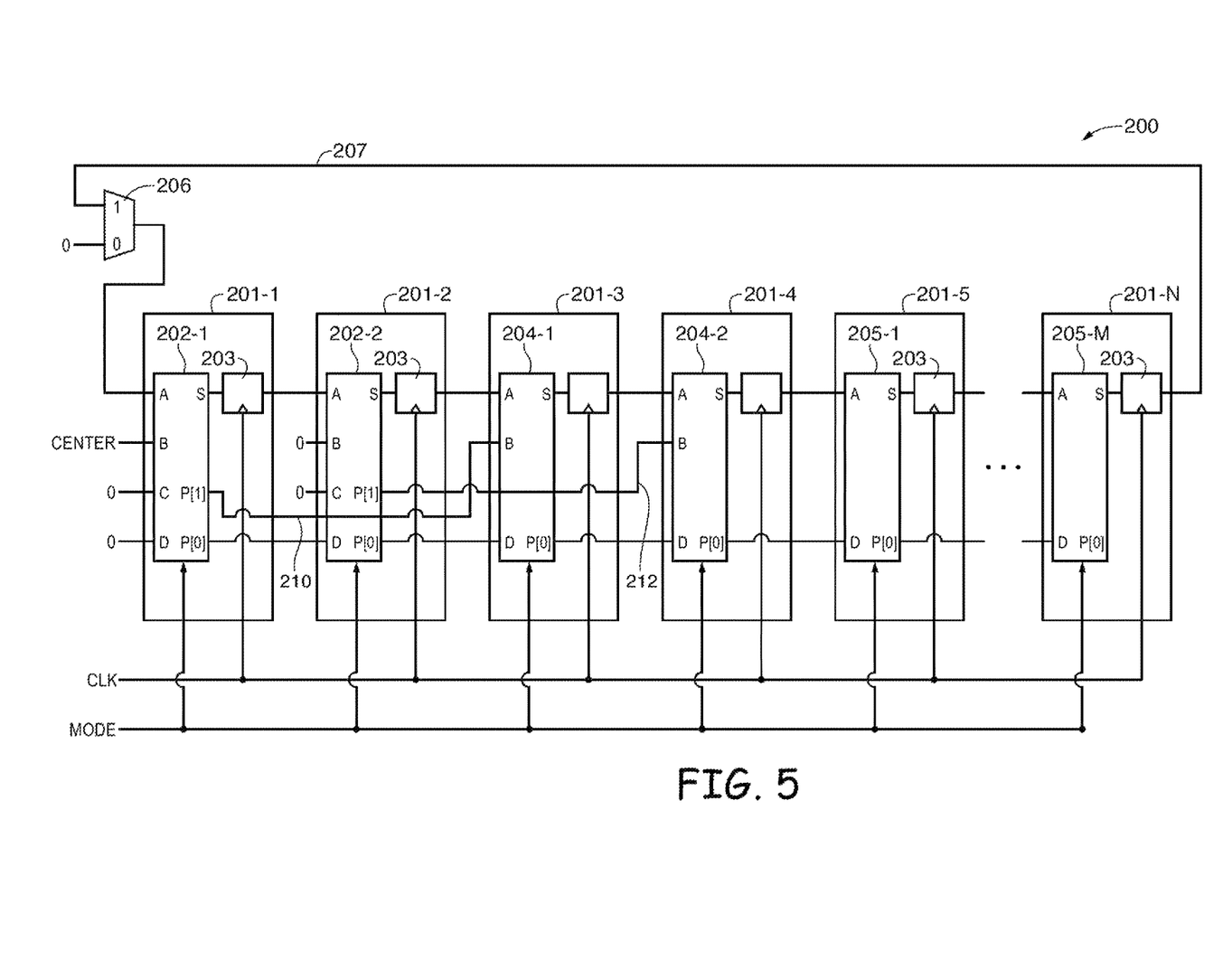
FIG. 5 is a diagram of illustrative arithmetic memory circuitry configured to implement a 0:1:0 horizontal binning in accordance with an embodiment of the present invention.

FIG. 5 is a diagram of an illustrative column arithmetic memory circuit 200 that is configured to provide the 0:1:0 horizontal binning capability. As shown in FIG. 5, arithmetic memory circuitry 200 may include N arithmetic units 201-1, 201-2, 201-3, 204-4, 201-5, . . . , and 201-N. The number of arithmetic units within circuitry 200 may depend on the ADC output bit width and any additional bits such as a sign bit for implementing subtraction and overflow bits. Each of the N arithmetic units 201 may include an adder and a flip-flop circuit 203. The adder in each arithmetic unit 201 may be controlled by a signal MODE. For example, the adder in each arithmetic unit 201 may be configured to perform addition when MODE has a first value and may be configured to perform subtraction when MODE has a second value that is different than the first value. Flip-flop 203 in each arithmetic unit 201 may be controlled by a clock signal CLK.

First arithmetic unit 201-1 may include a first four-input adder 202-1, whereas second arithmetic unit 201-2 may include a second four-input adder 202-2. Third arithmetic unit 201-3 may include a first three-input adder 204-1, whereas fourth arithmetic unit 201-4 may include a second three-input adder 204-2. The fifth arithmetic unit 201-5, the sixth arithmetic unit (not shown), and so on to the N-th arithmetic unit 201-N may include two-input adders 205-1, . . . , 205-M, respectively.

The four-input adders 202-1 and 202-2 may have a first (A) input, a second (B) input, a third (C) input, a fourth (D) input, a sum (S) output on which the sum of A, B, C, and D is provided, a first propagate output p[0], and a second propagate output p[1]. In the add mode, the result of A+B+C+D will be provided at the output S. In the subtract mode, A-B-C-D will be provided at the output S. In the add mode, the propagate signals may be computed as follows:

$$p[1]=A\&B\&C\&D \qquad (1)$$

$$p[0]=C\&(A\oplus D)\|B\&(A\oplus C)\|D\&(A\oplus B) \qquad (2)$$

where the symbol "&" represents the logic AND function, wherein "$\oplus$" represents the logic XOR function, and where "$\|$" represents the logic OR function. Computed using equations 1 and 2, the propagate signals serve as "carry out" signals for addition. In the subtract mode, the propagate signals may be computed as follows:

$$p[1]=!A\&B\&C\&D \qquad (3)$$

$$p[0]=D\&(A\sim\oplus C)\|!A\&(B\oplus C)\|B\&(C\oplus D) \qquad (4)$$

where the symbol "!" represents the logic inversion function and where "$\sim\oplus$" represents the logic XNOR function. Computed using equations 3 and 4, the propagate signals serve as "borrow" signals for subtraction.

The three-input adders 204-1 and 204-2 may have a first (A) input, a second (B) input, a third (D) input, a sum (S) output on which the sum of A, B, and C is provided, and a propagate output p[0]. In the add mode, the result of A+B+D will be provided at the output S. In the subtract mode, A-B-D will be provided at the output S. In the add mode, the propagate signal may be computed as follows:

$$p[0]=(A\&B)\|(B\&C)\|(C\&A) \qquad (5)$$

Computed using equation 5, the propagate signal serves as a "carry out" signal for addition. In the subtract mode, the propagate signals may be computed as follows:

$$p[0]=(A\&B\&C)\|(!A\&(B\|C)) \qquad (6)$$

Computed using equation 6, the propagate signal serves as a "borrow" signal for subtraction.

Each of the two input adders 205-1 . . . 205-N may have a first (A) input, a second (D) input, a sum (S) output on which the sum of A and D is provided, and a propagate output p[0]. In the add mode, the result of A+D will be provided at the output S. In the subtract mode, the result of A-D will be provided at the output S. Propagate signal p[0] may be computed using conventional carry-out and borrow equations suitable for two-input adders that are well known in the art.

Arithmetic units 201 may be coupled in series in a chain. In particular, the sum output of each arithmetic unit may be coupled to the A input of the subsequent arithmetic unit via an associated flip-flop 203. In general, the p[0] output of each arithmetic unit may be coupled to the D input of the subsequent arithmetic unit. When the D input receives the p[0] propagate signal, input D serves as a carry-in input. Connected in this way, unit 201-1 may serve as the least significant bit (LSB) unit, whereas unit 201-N may serve as the most significant bit (MSB) unit. Similarly, unit 201-2 may serve as the LSB+1 unit; unit 201-3 may serve as the LSB+2; unit 201-4 may serve as the LSB+3 unit, etc. In other words, the values output by the LSB+1 unit is double that of the LSB unit; the values output by the LSB+2 unit is four times that of the LSB unit, and so on.

Circuitry may also include a multiplexer 206 having a first (0) input that receives a logic "0," a second (1) input that is coupled to the sum output of the MSB arithmetic unit 201-N via feedback path 207, and an output that is coupled to input A of arithmetic unit 201-1. Connected in this way, multiplexer 206 may be configured to route the logic "0" from its first input to its output during reset signal readout operations and may be configured to route the bits from feedback path 206 to its output during image signal readout operations to implement correlated double sampling (CDS). As described above, each arithmetic unit 201 may be configured to subtract the image signal from the reset signal when receiving both the previously stored reset signal via path 207 and the newly acquired image signal.

To implement the 0:1:0 horizontal binning, adder 202-1 may be configured to receive OUT_CENTER (abbreviated as CENTER) at input B and logic zeroes at inputs C and D, whereas adder 202-2 may be configured to receive logic zeroes at inputs B and C. The p[1] output of adder 202-1 may be coupled to input B of 204-1 via path 210, whereas the p[1] output of adder 202-2 may be coupled to input B of adder 204-2 via path 212. Connected in this way, only signal CENTER contributes to the final result of arithmetic memory circuit 200 (while signals OUT_LEFT and OUT_RIGHT are discarded).

Figure 6:
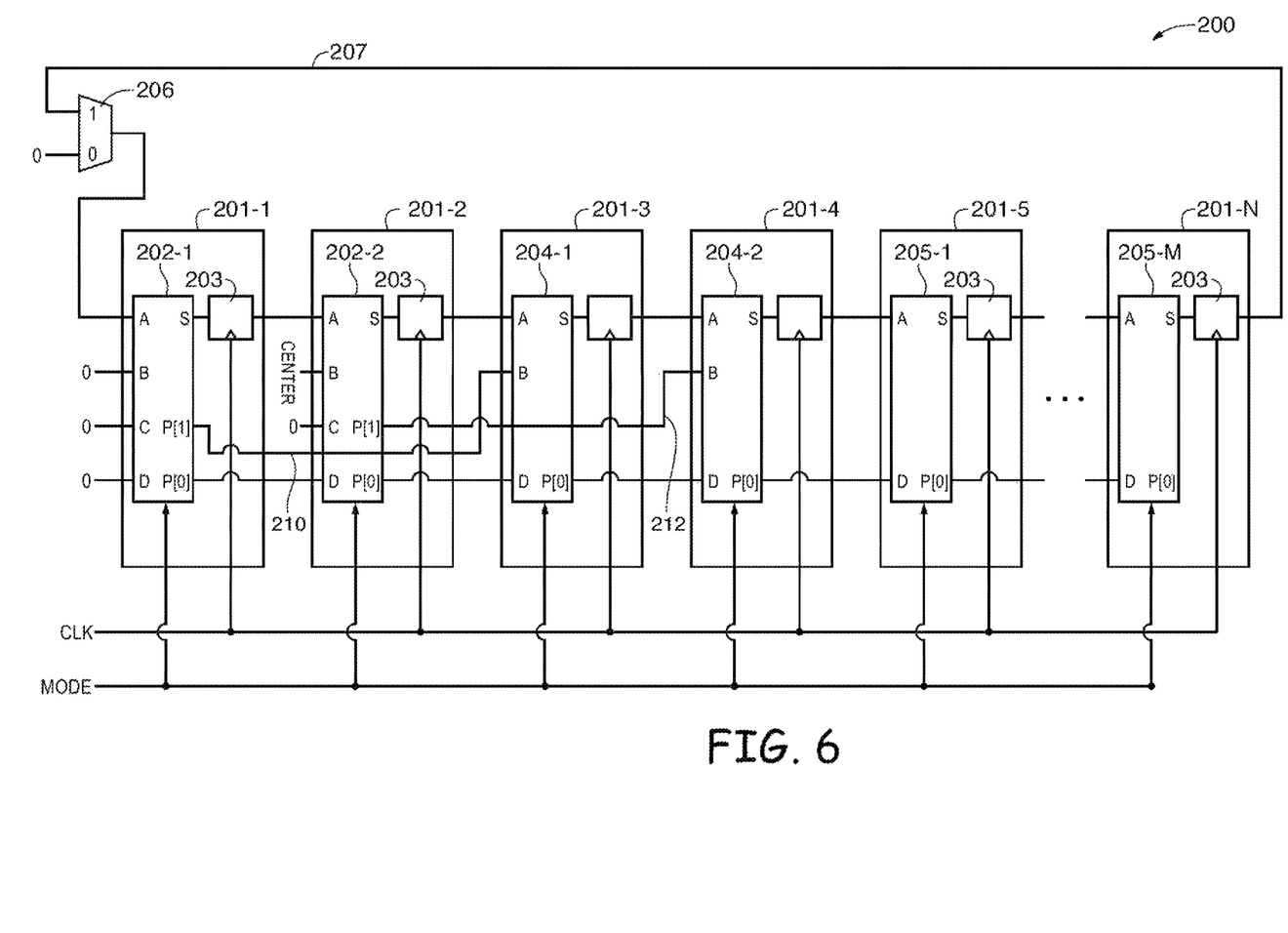
FIG. 6 is a diagram of illustrative arithmetic memory circuitry configured to implement a 0:2:0 horizontal binning in accordance with an embodiment of the present invention.

In another suitable arrangement, arithmetic memory circuit 200 may be configured to provide the 0:2:0 horizontal binning capability (see, e.g., FIG. 6). To implement the 0:2:0 horizontal binning, adder 202-1 may be configured to receive logic zeroes at inputs B, C, and D, whereas adder 202-2 may be configured to receive signal CENTER at input B and logic "0" at input C. The p[1] output of unit 202-1 may be coupled to input B of 204-1, whereas the p[1] output of unit 202-2 may be coupled to input B of adder 204-2. Connected in this way in which OUT_CENTER is routed to the LSB+1 arithmetic unit, only double the value of OUT_CENTER contributes to the final result of arithmetic memory circuit 200 (while signals OUT_LEFT and OUT_RIGHT are discarded).

Figure 7:
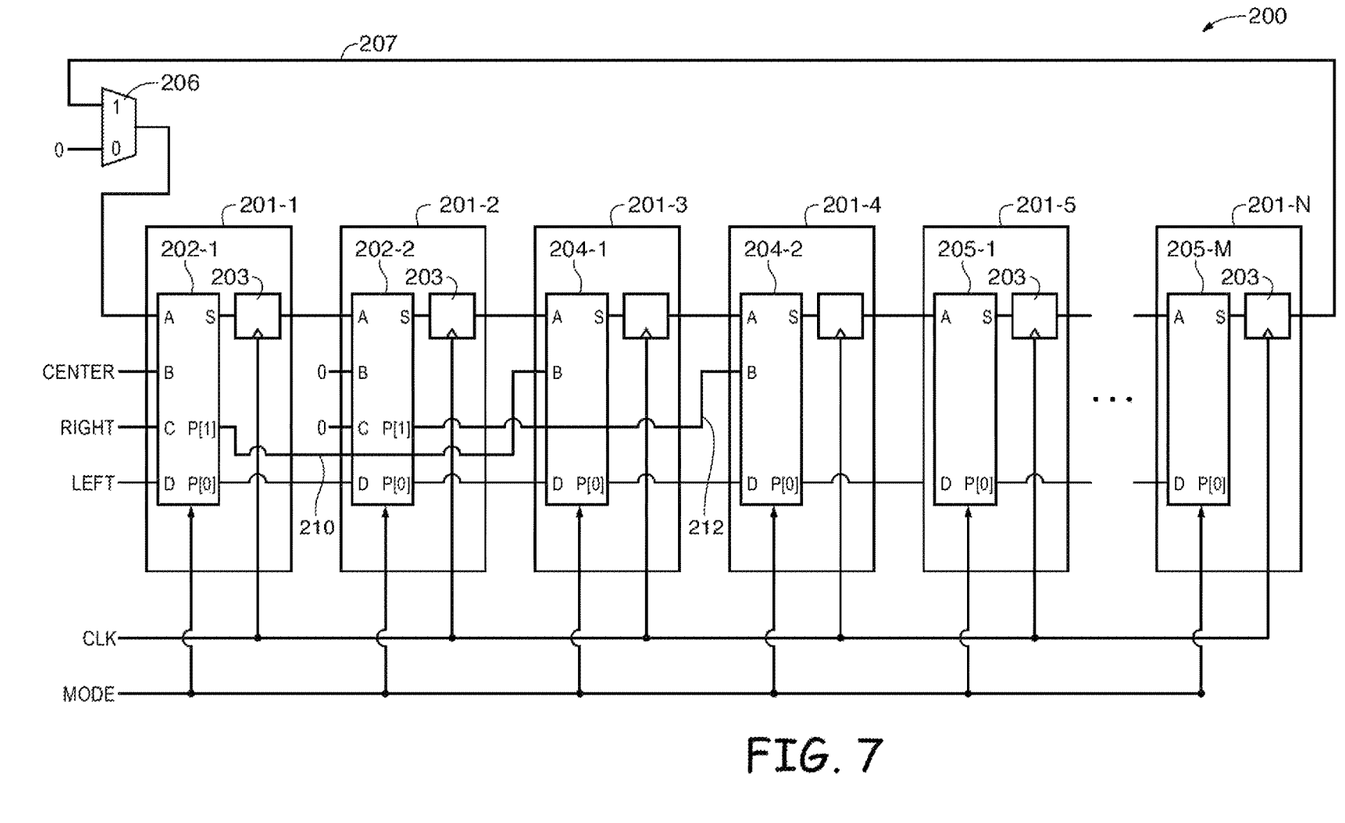
FIG. 7 is a diagram of illustrative arithmetic memory circuitry configured to implement a 1:1:1 horizontal binning in accordance with an embodiment of the present invention.

In another suitable arrangement, arithmetic memory circuit 200 may be configured to provide the 1:1:1 flat horizontal binning capability (see, e.g., FIG. 7). To implement the 1:1:1 horizontal binning, adder 202-1 may receive signals CENTER, OUT_RIGHT (abbreviated as RIGHT), and OUT_LEFT (abbreviated as LEFT) at inputs B, C, and D, respectively, whereas adder 202-2 receives signal logic zeroes at inputs B and C. The p[1] output of unit 202-1 may be coupled to input B of 204-1, whereas the p[1] output of unit 202-2 may be coupled to input B of unit 204-2. Connected in this way in which CENTER, RIGHT, and LEFT signals are coupled to the LSB unit, signals CENTER, RIGHT, and LEFT all contribute evenly to the final result of arithmetic memory circuit 200.

Figure 8:
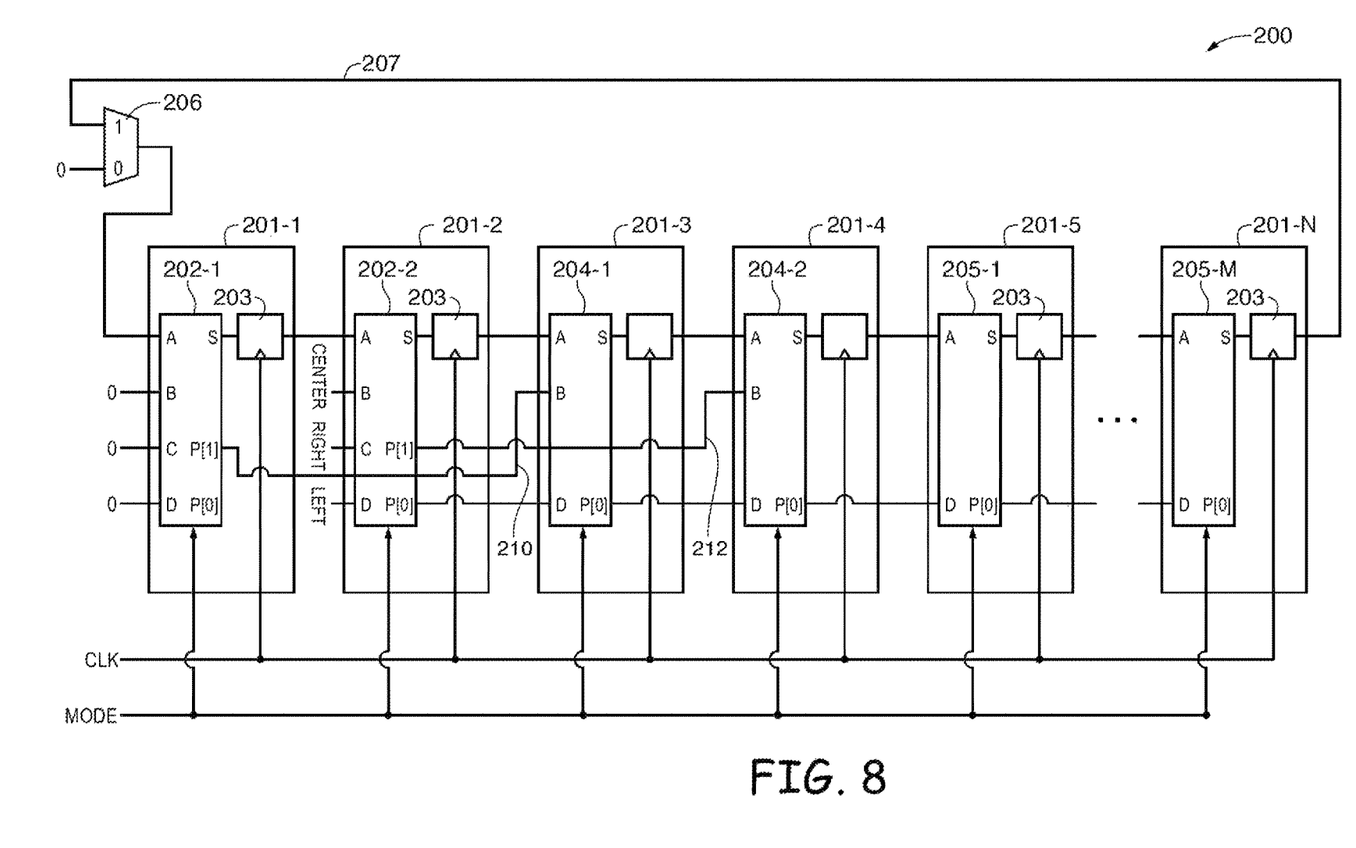
FIG. 8 is a diagram of illustrative arithmetic memory circuitry configured to implement a 2:2:2 horizontal binning in accordance with an embodiment of the present invention.

In another suitable arrangement, arithmetic memory circuit 200 may be configured to provide the 2:2:2 flat horizontal binning capability (see, e.g., FIG. 8). To implement the 2:2:2 horizontal binning, adder 202-1 may receive signals logic zeroes at inputs B, C, and D, whereas adder 202-2 may receive signals OUT_CENTER, OUT_RIGHT, and OUT_LEFT at inputs B, C, and D, respectively. The p[1] output of unit 202-1 may be coupled to input B of 204-1, whereas the p[1] output of unit 202-2 may be coupled to input B of adder 204-2. Connected in this way in which all of OUT_CENTER, OUT_RIGHT, and OUT_LEFT signals are coupled to the LSB+1 unit, signals OUT_CENTER, OUT_RIGHT, and OUT_LEFT all contribute evenly with a weighting factor of two to the final result of arithmetic memory circuit 200.

Figure 9:
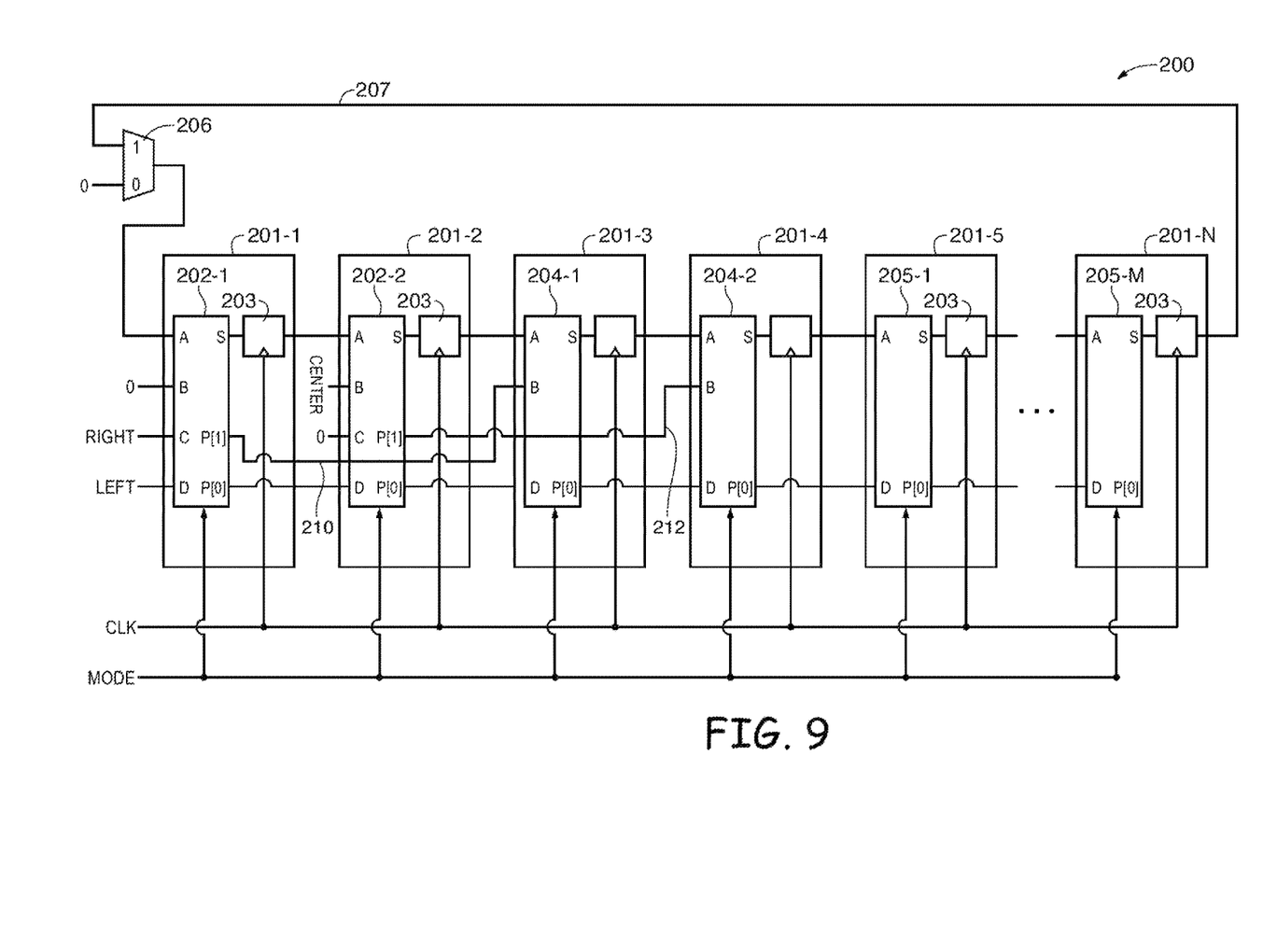
FIG. 9 is a diagram of illustrative arithmetic memory circuitry configured to implement a 1:2:1 horizontal binning in accordance with an embodiment of the present invention.

In another suitable arrangement, arithmetic memory circuit 200 may be configured to provide the 1:2:1 center-weighted horizontal binning capability (see, e.g., FIG. 9). To implement the 1:2:1 horizontal binning, adder 202-1 may receive signals logic zero at input B and signals OUT_RIGHT and OUT_LEFT at inputs C and D, respectively, whereas adder 202-2 may receive signals OUT_CENTER at input B and logic "0" at input C. The p[1] output of unit 202-1 may be coupled to input B of 204-1, whereas the p[1] output of unit 202-2 may be coupled to input B of adder 204-2. Connected in this way in which OUT_RIGHT and OUT_LEFT are coupled to the LSB unit while OUT_CENTER is coupled to the LSB+1 unit, signal OUT_CENTER contributes double the amount relative to signals OUT_RIGHT and OUT_LEFT in the final result of arithmetic memory circuit 200.

Figure 10:
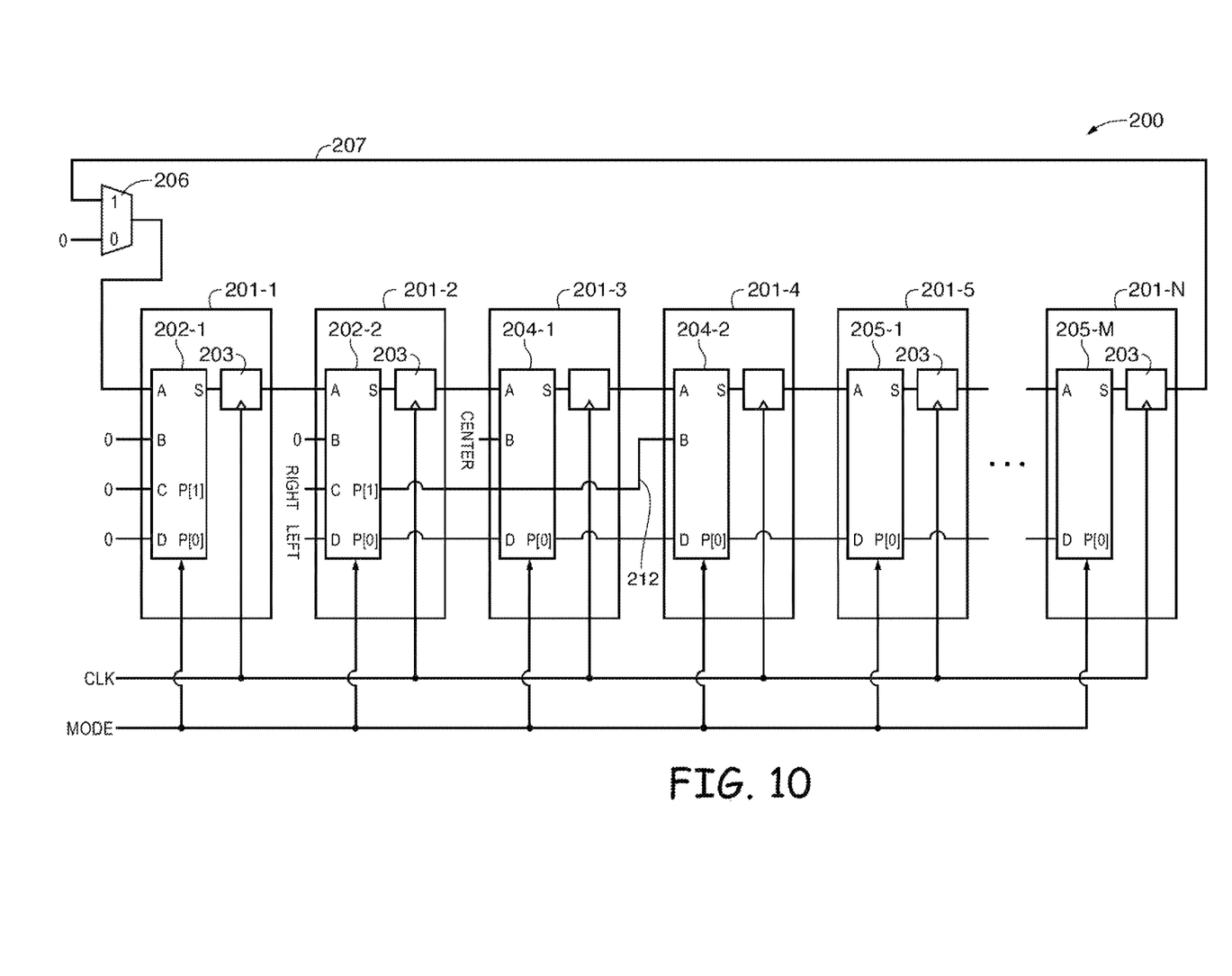
FIG. 10 is a diagram of illustrative arithmetic memory circuitry configured to implement a 2:4:2 horizontal binning in accordance with an embodiment of the present invention.

In another suitable arrangement, arithmetic memory circuit 200 may be configured to provide the 2:4:2 center-weighted horizontal binning capability (see, e.g., FIG. 10). To implement the 2:4:2 horizontal binning, adder 202-1 may receive signals logic zeroes at inputs B, C, and D; adder 202-2 may receive a logic zero at input B, signal OUT_RIGHT at input C, and signal OUT_LEFT at input D; and adder 204-1 may receive signal OUT_CENTER at input B. The p[1] output of adder 202-2 may be coupled to input B of unit 204-2 via path 212. Connected in this way, the weighting of signals OUT_RIGHT and OUT_LEFT is doubled while the weighting of signal OUT_CENTER is quadrupled in the final binned output.

The horizontal binning schemes described above in connection with FIGS. 4-10 are merely illustrative and do not serve to limit the scope of the present invention. In some arrangements, the routing between units 201 may be dynamically implemented to support the desired horizontal binning configuration (e.g., memory circuit is operable to provide multiple different horizontal binning schemes in different modes). If desired, other types of horizontal binning schemes such as 1:1:2, 2:1:2, 1:2:2, 1:4:2, 1:1:4, 1:4:4, 0:8:0, 2:8:2, 4:8:4, etc. can be implemented using a similar approach. If desired, Xbin2 (e.g., horizontal binning in which data from two different columns are combined), XBin4 (e.g., horizontal binning in which data from four different columns are combined), XBin5 (e.g., horizontal binning in which data from five different columns are combined), or other suitable types of horizontal binning may be implemented using a similar method. In general, these horizontal binning schemes may be combined with other well known vertical binning schemes (e.g., using multiplexer 206 to route pixel signals acquired from previous rows via the feedback path) to obtain any desired two-dimension binning arrangement across the image pixel array.

Figure 11:
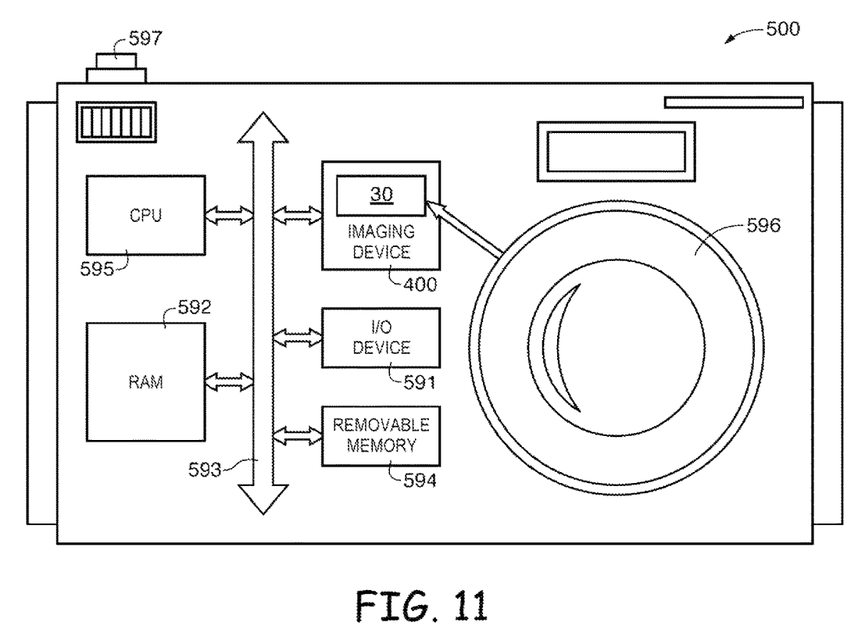
FIG. 11 is a block diagram of a system employing the embodiments of FIGS. 4-10 in accordance with an embodiment of the present invention.

FIG. 11 shows in simplified form a typical processor system 500, such as a digital camera, which includes an imaging device 400. Imaging device 400 may include a pixel array 30 having pixels of the type shown in FIG. 2 (e.g., pixel array 30 may be an array of image pixels 28) formed on an image sensor SOC. Processor system 500 is exemplary of a system having digital circuits that may include imaging device 400. Without being limiting, such a system may include a computer system, still or video camera system, scanner, machine vision, vehicle navigation, video phone, surveillance system, auto focus system, star tracker system, motion detection system, image stabilization system, and other systems employing an imaging device.

Processor system 500, which may be a digital still or video camera system, may include a lens such as lens 596 for focusing an image onto a pixel array such as pixel array 401 when shutter release button 597 is pressed. Processor system 500 may include a central processing unit such as central processing unit (CPU) 595. CPU 595 may be a microprocessor that controls camera functions and one or more image flow functions and communicates with one or more input/output (I/O) devices 591 over a bus such as bus 593. Imaging device 400 may also communicate with CPU 595 over bus 593. System 500 may include random access memory (RAM) 592 and removable memory 594. Removable memory 594 may include flash memory that communicates with CPU 595 over bus 593. Imaging device 400 may be combined with CPU 595, with or without memory storage, on a single integrated circuit or on a different chip. Although bus 593 is illustrated as a single bus, it may be one or more buses or bridges or other communication paths used to interconnect the system components.

Various embodiments have been described illustrating an imaging and response system (see, e.g., system 100 of FIG. 1) including an imaging system and host subsystems. An imaging system may include one or more image sensors. Each image sensor may include an array of image pixels formed on a semiconductor substrate. Each image pixel may include one or more photosensitive elements configured to convert incoming light into electric charges.

Image pixels arranged along a first column in the array may be coupled to a first column line. Image pixels arranged along a second column in the array may be coupled to a second column line. Image pixels arranged along a third column in the array may be coupled to a third column line. The first, second, and third column lines may be coupled to an arithmetic memory circuit and may be considered to be adjacent column lines in the array.

The arithmetic memory circuit may include a plurality of arithmetic units coupled in series. A first arithmetic unit in the chain may serve as an LSB arithmetic unit, whereas the last arithmetic unit in the chain may serve as an MSB arithmetic unit. The arithmetic memory circuit may also include a multiplexing circuit having an input that is coupled to the MSB arithmetic unit and an output that is coupled to the first arithmetic unit. Connected as such, the multiplexing circuit can be configured to provide correlated double sampling (CDS) and vertical binning capabilities for the pixel array.

The arithmetic memory may be operable to provide flat horizontal binning and weighted horizontal binning To provide flat horizontal binning, each of the first, second, and third column lines should be coupled to a common arithmetic unit in the arithmetic memory circuit. To provide weighted horizontal binning, a first portion of the three column lines should be coupled to one of the plurality of arithmetic units, whereas a second portion of the three column lines should be coupled to another one of the plurality of arithmetic units. In other suitable arrangements, only one of the three adjacent column lines is coupled to a corresponding one of the plurality of arithmetic units in the arithmetic memory circuit.

The foregoing is merely illustrative of the principles of this invention and various modifications can be made by those skilled in the art. The foregoing embodiments may be implemented individually or in any combination.

Although the invention has been described in some detail for the purposes of clarity, it will be apparent that certain changes and modifications can be practiced within the scope of the appended claims. Although some of the appended claims are single dependent only or reference only some of their preceding claims, their respective feature(s) can be combined with the feature(s) of any other claim.

What is claimed is:

1. A system, comprising:
   a central processing unit;
   memory;
   a lens;
   input-output circuitry; and
   an imaging device, wherein the imaging device comprises:
      a pixel array having a plurality of image pixels arranged in rows and columns;
      a group of adjacent column lines coupled to the pixel array; and
      an arithmetic memory circuit that is coupled to at least some column lines in the group of adjacent column lines and that implements weighted horizontal binning of pixel signals on the column lines, wherein the arithmetic memory circuit includes a plurality of arithmetic units coupled in series, and wherein a weight for each column line is determined by the particular arithmetic unit to which the column line is coupled.

2. The system defined in claim 1, wherein the plurality of arithmetic units includes first and second arithmetic units coupled in a series, wherein the first arithmetic unit serves as a least significant bit (LSB) arithmetic unit.

3. The system defined in claim 2, wherein each column line in the group of adjacent column lines is coupled to the first arithmetic unit, and wherein the weights of each column line are equal.

4. The system defined in claim 2, wherein a first column line in the group of adjacent column lines is coupled to the first arithmetic unit and a second column line in the group of adjacent column lines is coupled to the second arithmetic unit, and wherein the weight of the second column line is twice the weight of the first column line.

5. The system defined in claim 2, wherein the arithmetic memory circuit further includes a multiplexer having an input that is coupled to the last arithmetic unit in the series and an output that is coupled to the first arithmetic unit, and wherein the multiplexing circuit is configured to provide correlated double sampling (CDS) and vertical binning capabilities for the pixel array.

6. The system defined in claim 1, wherein the imaging device further includes an additional group of adjacent column lines coupled to the pixel array and an additional arithmetic memory circuit that is coupled to at least some column lines in the additional group of adjacent column lines.

7. The system defined in claim 1, wherein the arithmetic memory circuit is operable in a first mode that supports flat horizontal binning and a second mode that supports weighted horizontal binning.

* * * * *